United States Patent
Tanaka

[11] Patent Number: 5,914,567
[45] Date of Patent: Jun. 22, 1999

[54] CRT DISPLAY APPARATUS, FIELD RADIATION RESTRICTION CIRCUIT AND FIELD RADIATION RESTRICTION ELECTRODE

[75] Inventor: Daisuke Tanaka, Tokyo, Japan

[73] Assignee: Mitsubishi Denki Kabushiki Kaisha, Tokyo, Japan

[21] Appl. No.: 08/699,730

[22] Filed: Aug. 20, 1996

[30] Foreign Application Priority Data

Apr. 16, 1996 [JP] Japan ................................ 8-094300

[51] Int. Cl.⁶ ............................................ H04N 9/29
[52] U.S. Cl. .................... 315/85; 315/368.18; 315/370; 315/8
[58] Field of Search ................... 315/85, 8, 370, 315/368.18

[56] References Cited

U.S. PATENT DOCUMENTS 5,404,084  4/1995  Onodera et al. .................... 315/370
5,475,287  12/1995  Okuyama et al. .................. 315/370

FOREIGN PATENT DOCUMENTS 4-315741  11/1992  Japan .
6-289801  10/1994  Japan .
7-142008  6/1995  Japan .

*Primary Examiner*—Arnold Kinkead
*Attorney, Agent, or Firm*—Burns, Doane, Swecker & Mathis, L.L.P.

[57] ABSTRACT

A display apparatus including a CRT having a deflection yoke, a plurality of field radiation restriction electrodes and a field radiation restriction circuit including an amplitude adjuster for applying, to at least one of the field radiation restriction electrodes, pulse voltage having polarity in reverse to the polarity of pulse voltage to be applied to the deflection yoke and a differential waveform adjuster for applying, to at least another field radiation restriction electrode, pulse voltage obtained by differentiating the pulse voltage to be applied to the deflection yoke. The plural field radiation restriction electrodes are provided; voltage having the polarity in reverse to that of the pulse voltage to be applied to the deflection yoke is applied to at least one of the plural field radiation restriction electrodes; and voltage obtained by differentiating the pulse voltage to be applied to the deflection yoke is applied to at least another field radiation restriction electrode so as to cancel an electric field radiated from the tube surface of the CRT.

10 Claims, 11 Drawing Sheets

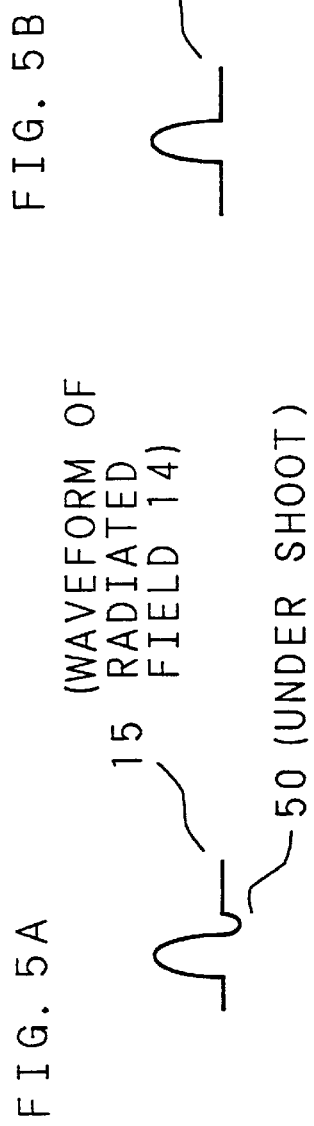
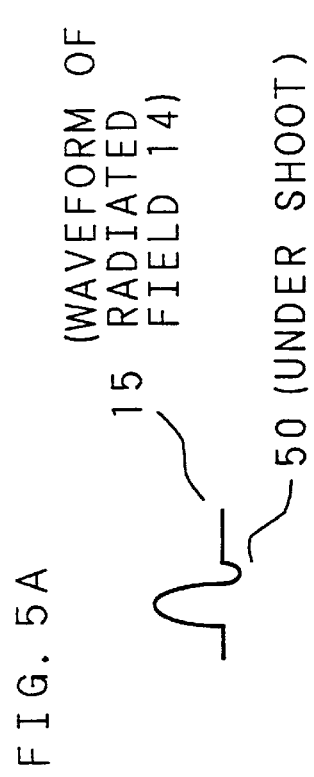
FIG. 5B (RETRACE LINE PULSE)
FIG. 5C (OUTPUT SIGNAL OF FLY-BACK TRANSFORMER 7)
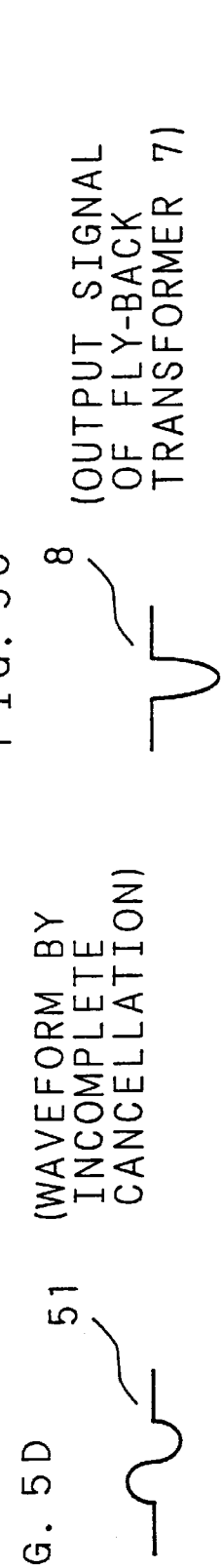
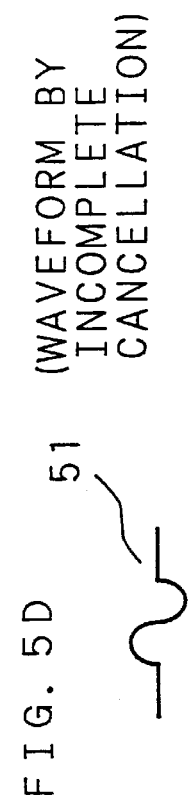
FIG. 5A (WAVEFORM OF RADIATED FIELD 14)
FIG. 5D (WAVEFORM BY INCOMPLETE CANCELLATION)
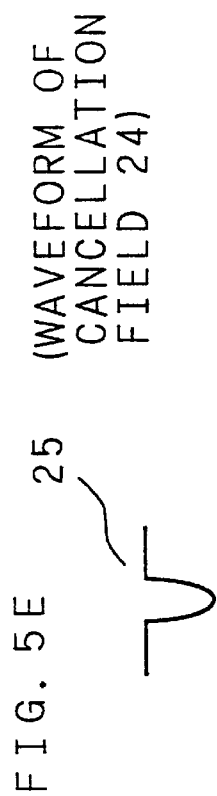
FIG. 5E (WAVEFORM OF CANCELLATION FIELD 24)
FIG. 5F (WAVEFORM OF CANCELLATION FIELD 26)

CRT DISPLAY APPARATUS, FIELD RADIATION RESTRICTION CIRCUIT AND FIELD RADIATION RESTRICTION ELECTRODE

BACKGROUND OF THE INVENTION

1. Field of the Invention

The present invention relates to a display apparatus capable of restricting field radiation from a CRT (Cathode Ray Tube) thereof, a field radiation restriction circuit and a field radiation restriction electrode for restricting the field radiation.

2. Description of Related Art

A display apparatus having a CRT for use in a TV set, personal computer or the like involves radiation of an electric field to the environment of the display apparatus taking place mainly due to pulse voltage applied to a deflection yoke of the CRT. Since the field radiation is useless radiation, there arises a requirement for reducing the radiation toward the front portion of the image screen of the CRT in which a person viewing the image screen exists.

FIG. 1 is a schematic view showing the structure of a display apparatus having a structure similar to that disclosed in, for example, Japanese Patent Application Laid-Open No. 4-315741 and including a circuit capable of restricting field radiation from the CRT. Referring to FIG. 1, reference numeral 100 represents a display apparatus. The display apparatus 100 includes a CRT (Cathode Ray Tube) 1 having a tube surface 3, a deflection yoke 2 for scanning the image screen of the CRT 1, a cancellation electrode (a field radiation restriction electrode) 4 disposed adjacent to the tube surface 3 of the CRT 1 and capable of generating an electric field, a field radiation restriction circuit 99 for controlling generation of the electric field in the cancellation electrode 4, a horizontal deflection circuit 5 which is a circuit attached to the CRT 1 and capable of generating a horizontal-deflection retrace line pulse 6 to be applied to the deflection yoke 2, and a fly-back transformer 7 having a coil for transmitting a signal 8 having the polarity in reverse to that of the retrace line pulse 6. The field radiation restriction circuit 99 includes an amplitude adjuster 9, composed of two capacitors 10 and 11, and a phase adjuster 12 composed of a capacitor 10 and a variable resistor 13.

The horizontal deflection circuit 5 transmits the retrace line pulse 6 to the fly-back transformer 7. The fly-back transformer 7 transmits, to the field radiation restriction circuit 99, the output signal 8 having a waveform similar to that of the retrace line pulse 6 and having the polarity in reverse to that of the retrace line pulse 6. The field radiation restriction circuit 99 applies voltage to the cancellation electrode 4. The deflection yoke 2 radiates a radiated field 14 having a waveform 15 toward the front portion of the tube surface 3 of the CRT 1, while the cancellation electrode 4 radiates a cancellation field 16 having a waveform 17.

The operation will now be described. Mainly due to the horizontal-deflection retrace line pulse to be applied to the deflection yoke 2 during the operation of the CRT 1, the radiated field 14 is radiated from the tube surface 3 of the CRT 1. To cancel the radiated field 14, voltage is applied to the cancellation electrode 4, the voltage causing an electric field, having the polarity in reverse to that of the radiated field 14, to be generated. The voltage having the reversed polarity causes the cancellation electrode 4 to radiate the cancellation field 16. The waveform 17 is a reversed waveform like the waveform 15 of the radiated field 14 and synchronizes with the radiated field 14. Therefore, the radiated field 14 from the tube surface 3 of the CRT 1 is substantially canceled by the cancellation field 16.

As a voltage signal for causing the cancellation electrode 4 to generate the cancellation field 16 having the waveform 17, a signal for use in another purpose is employed. For example, the signal obtainable from the retrace line pulse 6 of the horizontal deflection circuit 5 has a waveform somewhat similar to the waveform of the radiated field 14 radiated from the deflection yoke 2 toward the front portion of the tube surface 3 of the CRT 1 and synchronized with the radiated field 14. Therefore, as the voltage signal to be supplied to the cancellation electrode 4, the output signal 8 obtainable from, for example, the fly-back transformer 7, is usually employed.

Referring to FIG. 1, the voltage obtained in response to the output signal 8 from the fly-back transformer 7, to which the retrace line pulse 6 is supplied from the horizontal deflection circuit 5, is applied to the cancellation electrode 4 through the phase adjuster 12, composed of the capacitor 10 and the variable resistor 13, and the amplitude adjuster 9 composed of the capacitors 10 and 11. By adjusting the phase adjuster 12 and the amplitude adjuster 9, the waveform of the output signal 8 from the fly-back transformer 7 is made to be similar to a waveform which is able to effectively cancel the radiated field 14 from the tube surface 3 of the CRT 1.

To describe a problem experienced with the conventional display apparatus, the waveform 15 of the radiated field 14 from the tube surface 3 of the CRT 1 and the waveform 17 of the cancellation field 16 from the cancellation electrode 4 are, in detail, shown in FIG. 2. Referring to FIG. 2, reference numeral 50 represents an under shoot portion of the waveform 15, and 51 represents a waveform which is the difference between the waveform 15 and the waveform 17. As shown in FIG. 2, the waveform 15 of the radiated field 14 is different from the waveform 17 of the cancellation field 16 at a point at which the under shoot portion 50 is formed as a waveform component. Therefore, the difference as indicated by the waveform 51 shown in FIG. 2 is unintentionally left. Thus, a satisfactory cancellation effect cannot be obtained. Even if the output signal 8 from the fly-back transformer 7 is divided by the capacitors 10 and 11 after allowed to pass through the variable resistor 13, the undershoot waveform component cannot be created. On the contrary, the phase of the waveform of the output signal 8 is delayed and, therefore, the waveform is made to be a further different waveform. As a result, the electric field cannot easily be canceled. As described above, the waveform 15 of the radiated field 14 from the tube surface 3 of the CRT 1 and the waveform 17 of the cancellation field 16 from the cancellation electrode 4 cannot easily be made to be completely similar to each other. Therefore, there arises a problem in that the radiated field 14 cannot satisfactorily be canceled.

In CRT display apparatus developed recently, the scanning frequency can be varied depending upon the type of the adapted personal computer. In a case where the scanning frequency has been switched, the waveform 15 of the radiated field 14, in particular, the size of the under shoot portion 50 is changed. Since the phase adjuster 12 and the amplitude adjuster 9, however, have constant frequency characteristics, the cancellation adjustment is disordered if the scanning frequency is changed. Although cancellation can be performed at a certain scanning frequency, cancellation of the electric field cannot satisfactorily be performed if the frequency is changed. Thus, the radiated electric field is unintentionally intensified.

Another conventional circuit capable of restricting the field radiation from the tube surface 3 of the CRT 1 has been disclosed in Japanese Patent Application Laid-Open No. 7-142008, wherein a cancellation electrode is disposed between an external graphite member of the CRT and an opening in the deflection yoke to cause the physical positions of the cancellation electrode and the deflection yoke to approach each other. However, a special fitting tool is required to dispose the cancellation electrode at the foregoing position, thus causing a problem to arise in that the working property deteriorates.

Another conventional structure has been disclosed in Japanese Patent Application Laid-Open No. 6-289801, wherein cancellation pulse voltage is superimposed on the output voltage from a high voltage generating circuit to cause the cancellation field to be radiated from a shadow mask (an aperture grille) through an anode. However, a special and costly voltage resisting capacitor is required to superimpose the cancellation voltage on the high voltage generating circuit.

SUMMARY OF THE INVENTION

An object of the present invention is to provide a field radiation restriction electrode, a field radiation restriction circuit and a display apparatus having the same each of which is capable of effectively canceling an electric field radiated from the tube surface of a CRT without a necessity of employing a special part.

Another object of the present invention is to provide a field radiation restriction electrode, a field radiation restriction circuit and a display apparatus having the same with which an attaching operation and adjustment operation can easily be performed.

A display apparatus according to the present invention comprises a CRT having a deflection yoke; a plurality of field radiation restriction electrodes; and a field radiation restriction circuit including an amplitude adjuster for applying, to at least one of the plural field radiation restriction electrodes, pulse voltage, the polarity of which is in reverse to the polarity of pulse voltage to be applied to the deflection yoke, and a differential waveform adjuster for applying, to at least one of the plural field radiation restriction electrodes, which is different from the electrode to which the pulse voltage has been applied, pulse voltage obtained by differentiating the pulse voltage to be applied to the deflection yoke. Since the plural field radiation restriction electrodes are provided; voltage having the polarity in reverse to that of the pulse voltage to be applied to the deflection yoke is applied to one of the plural field radiation restriction electrodes; and voltage obtained by differentiating the pulse voltage to be applied to the deflection yoke is applied to at least another field radiation restriction electrode so as to cancel an electric field radiated from the tube surface of the CRT, cancellation of the electric field can be performed accurately.

The amplitude adjuster of the field radiation restriction circuit of the display apparatus includes a capacitor dividing circuit having at least one trimmer capacitor. Since the trimmer capacitor is employed in the amplitude adjuster, the size of the waveform of the cancellation electric field from the field radiation restriction electrode can continuously be changed while maintaining a similar shape.

The differential waveform adjuster of the field radiation restriction circuit of the display apparatus includes a differential circuit having two capacitors and one variable resistor. Therefore, the differential waveform component of the cancellation electric field from the field radiation restriction electrodes can continuously be changed. As a result, in a case where display apparatuses each having a CRT are mass-produced, scattering in unnecessary radiation occurring due to the production process can be absorbed while requiring a low cost structure.

The field radiation restriction circuit of the display apparatus includes a variable capacity circuit or a variable resistor circuit. Therefore, the differential waveform of the cancellation electric field from the field radiation restriction electrode can continuously be changed.

The field radiation restriction circuit of the display apparatus includes a control portion for selecting optimum data for restricting field radiation in accordance with the magnitude of the horizontally deflected frequency and a variable resistor circuit or variable capacity circuit to be controlled in accordance with the data. Therefore, the cancellation field from the field radiation restriction electrode can be adjusted to an optimum field in accordance with the horizontally deflected frequency. Thus, even if the horizontally deflected frequency is changed, an optimum cancellation field can always be maintained.

The field radiation restriction electrodes of the display apparatus are composed of plural printed wiring patterns formed on one printed wiring board disposed substantially perpendicular to the axis of the CRT in such a manner that the plural printed wiring patterns do not overlap. The structure in which the plural field radiation restriction electrodes are included in the printed wiring board disposed substantially perpendicular to the axis of the CRT facilitates the attachment of the electrodes. The field radiation restriction electrodes are bonded and secured to the reverse surface of a bezel of the CRT thanks to the bonding adhesive layer formed on either side of the printed wiring board. As a result, a plurality of electrodes can be bonded and attached to the reverse side of the bezel at the same time so that the working properties are maintained even if a plurality of electrodes are attached.

The above and further objects and features of the invention will more fully be apparent from the following detailed description with accompanying drawings.

BRIEF DESCRIPTION OF THE DRAWINGS

FIGS. 5A to 5F are graphs showing electric fields and voltage waveforms realized in the respective portions shown in FIG. 3;

DESCRIPTION OF THE PREFERRED EMBODIMENTS

Preferred embodiments of the present invention will now be described with reference to the drawings.

First Embodiment

Figure 1:
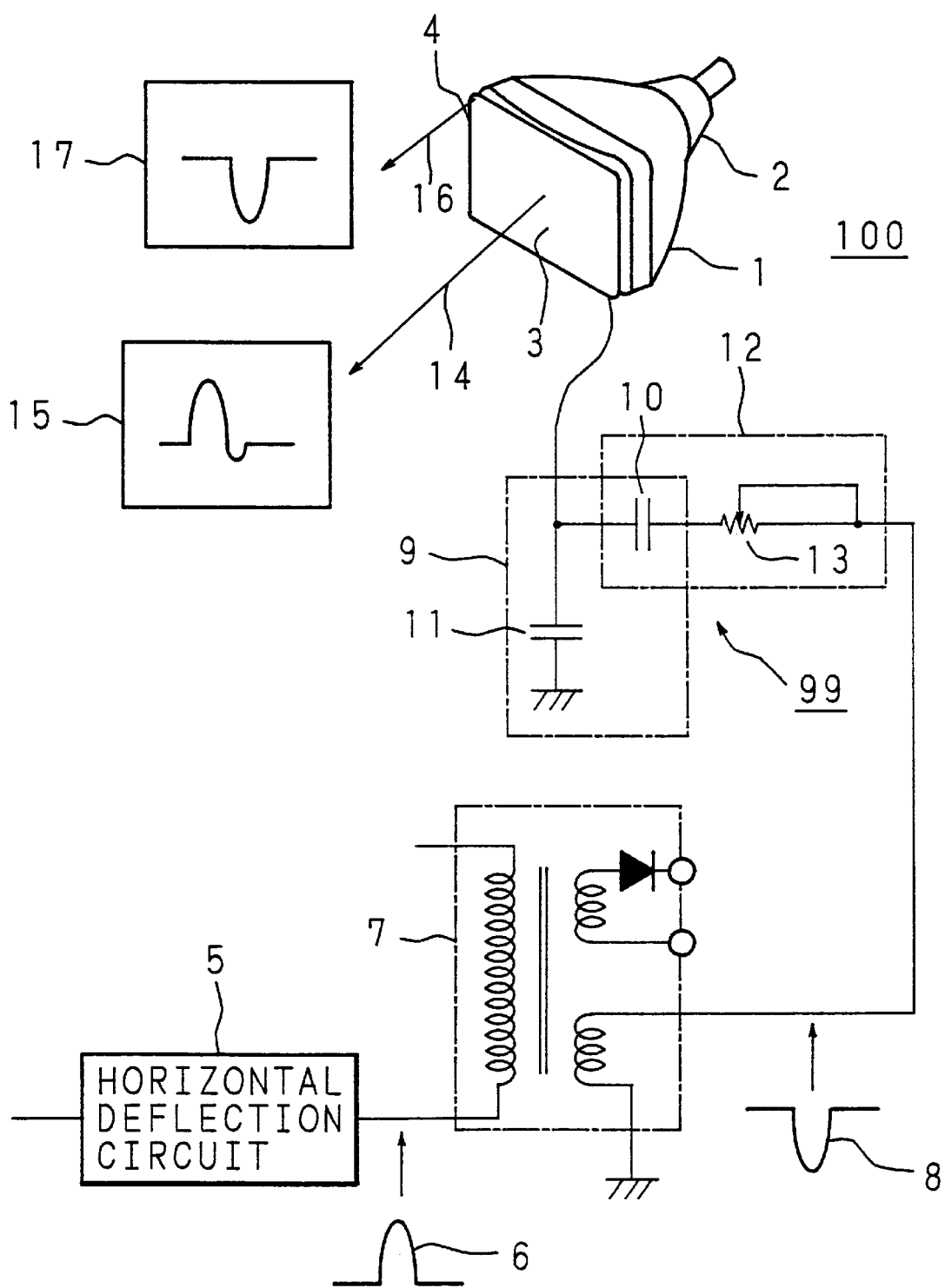
FIG. 1 is a structural view showing a conventional display apparatus including a field radiation restriction circuit.
Figure 2:
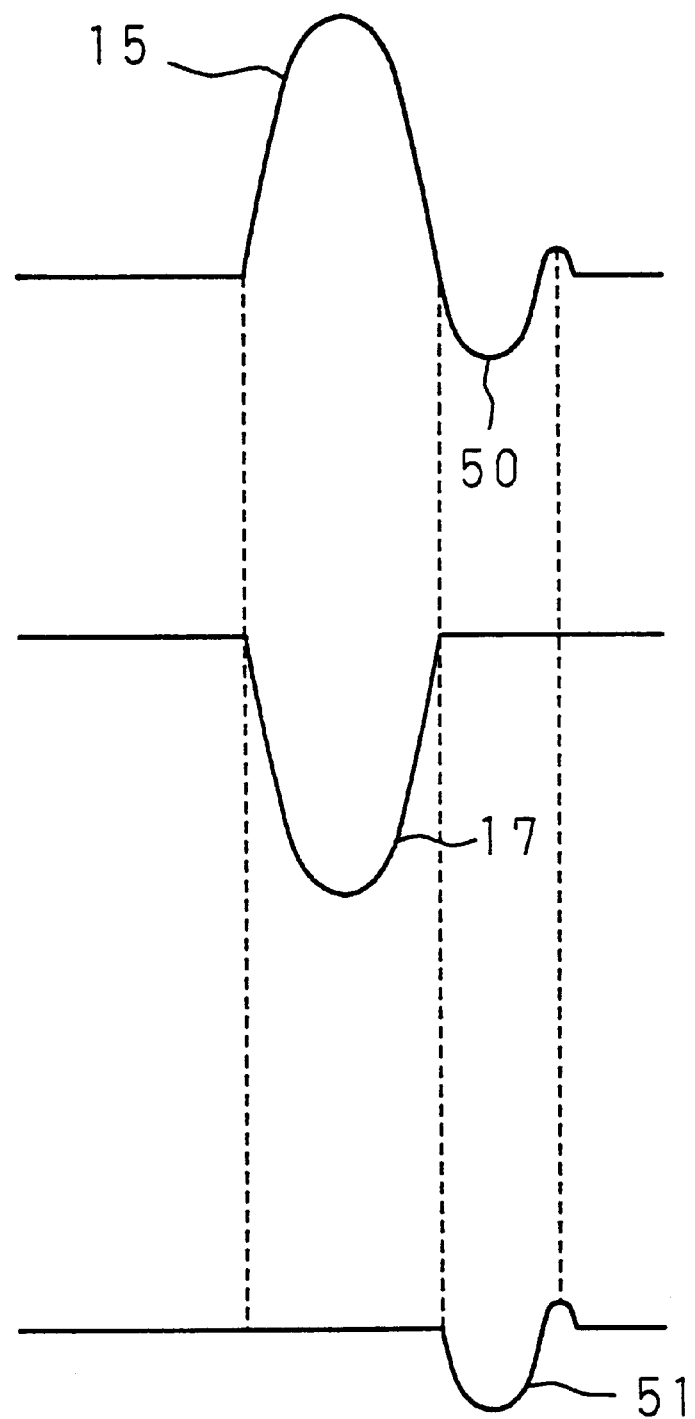
FIG. 2 is a graph showing waveforms of electric fields realized in the conventional display apparatus shown in FIG. 1.
Figure 3:
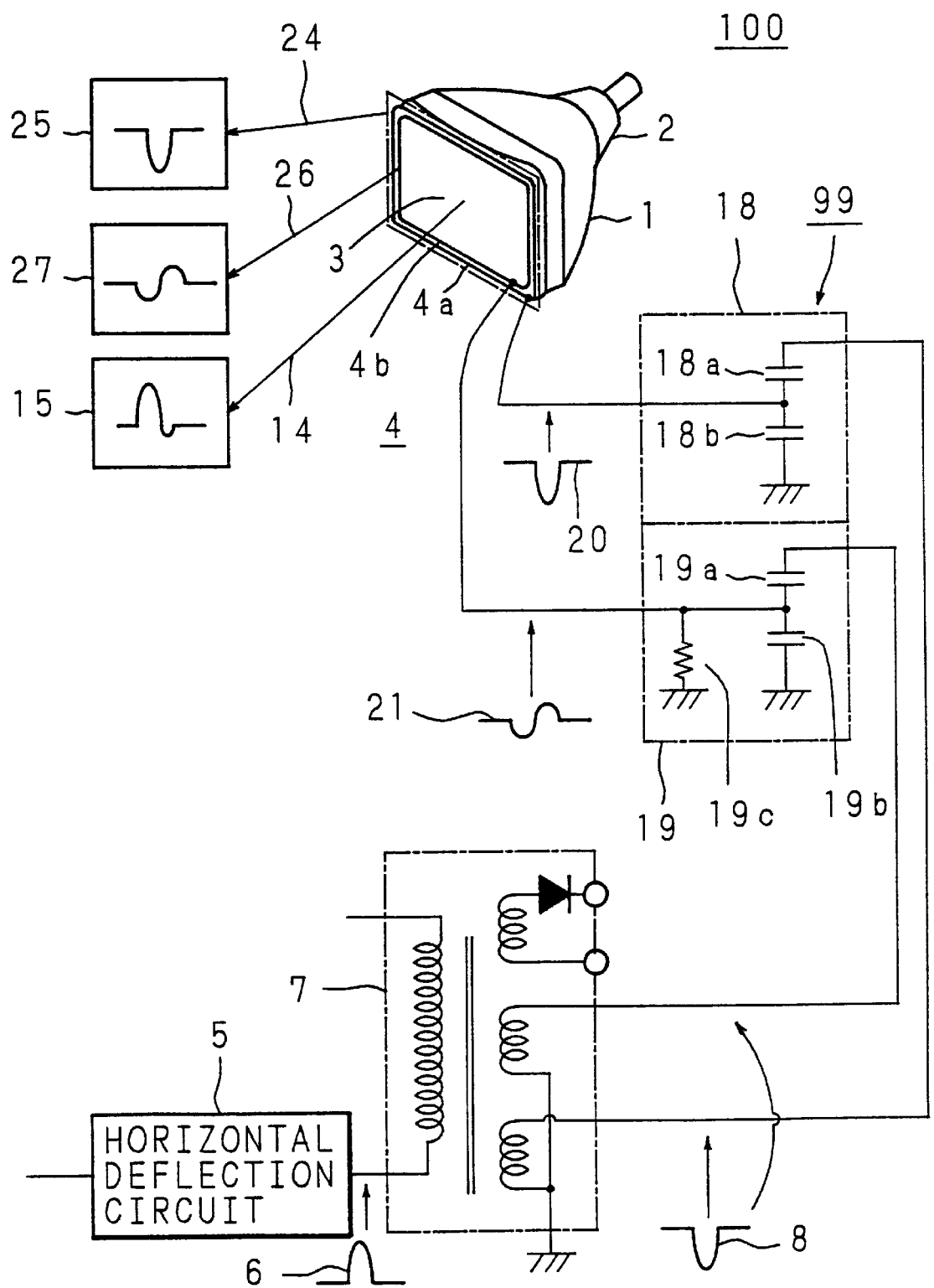
FIG. 3 is a structural view showing a display apparatus including a field radiation restriction circuit according to a first embodiment of the present invention.

A first embodiment of the present invention will now be described with reference to FIGS. 3 to 5. Referring to FIG. 3, reference numeral 100 represents a display apparatus. The display apparatus 100 includes a CRT 1 having a tube surface 3, a deflection yoke 2 for scanning the image screen of the CRT 1, a cancellation electrode (a field radiation restriction electrode) 4 disposed adjacent to the tube surface 3 of the CRT 1 and capable of generating an electric field having the polarity in reverse to that of the electric field radiated toward the front portion of the tube surface 3 of the CRT 1, a horizontal deflection circuit 5 which is a circuit attached to the CRT 1 and capable of generating a horizontal-deflection retrace line pulse 6 to be applied to the deflection yoke 2, a fly-back transformer 7 having a coil for transmitting a signal 8 having the polarity in reverse to that of the retrace line pulse 6, and a field radiation restriction circuit 99 for controlling generation of the electric field in the cancellation electrode 4. The cancellation electrode 4 has a first cancellation electrode 4a and a second cancellation electrode 4b. The field radiation restriction circuit 99 has an amplitude adjuster 18, composed of capacitors 18a and 18b, and a differential waveform adjuster 19 composed of capacitors 19a and 19b and a resistor 19c.

The horizontal deflection circuit 5 transmits the retrace line pulse 6 to the fly-back transformer 7. The fly-back transformer 7 transmits, to the amplitude adjuster 18 and the differential waveform adjuster 19 in the field radiation restriction circuit 99, the output signal 8 having a waveform similar to that of the retrace line pulse 6 and having the polarity in reverse to that of the retrace line pulse 6. The amplitude adjuster 18 causes the capacitors 18a and 18b to capacitor-divide the output signal 8 from the fly-back transformer 7 to obtain first cancellation pulse voltage 20, which is applied to the first cancellation electrode 4a. The differential waveform adjuster 19 causes the capacitors 19a and 19b and the resistor 19c to capacitor-divide and differentiate the output signal 8 from the fly-back transformer 7 to obtain second cancellation pulse voltage 21, which is applied to the second cancellation electrode 4b. The deflection yoke 2 radiates a radiated field 14 having a waveform 15 to the front portion of the tube surface 3 of the CRT 1. On the other hand, the first cancellation electrode 4a radiates a first cancellation field 24 having a waveform 25 in accordance with the first cancellation pulse voltage 20. The second cancellation electrode 4b radiates a second cancellation field 26 having a waveform 27 in accordance with the second cancellation pulse voltage 21. The first cancellation field 24 and the second cancellation field 26 are radiated to the front portion of the tube surface 3 of the CRT 1.

Figure 4:
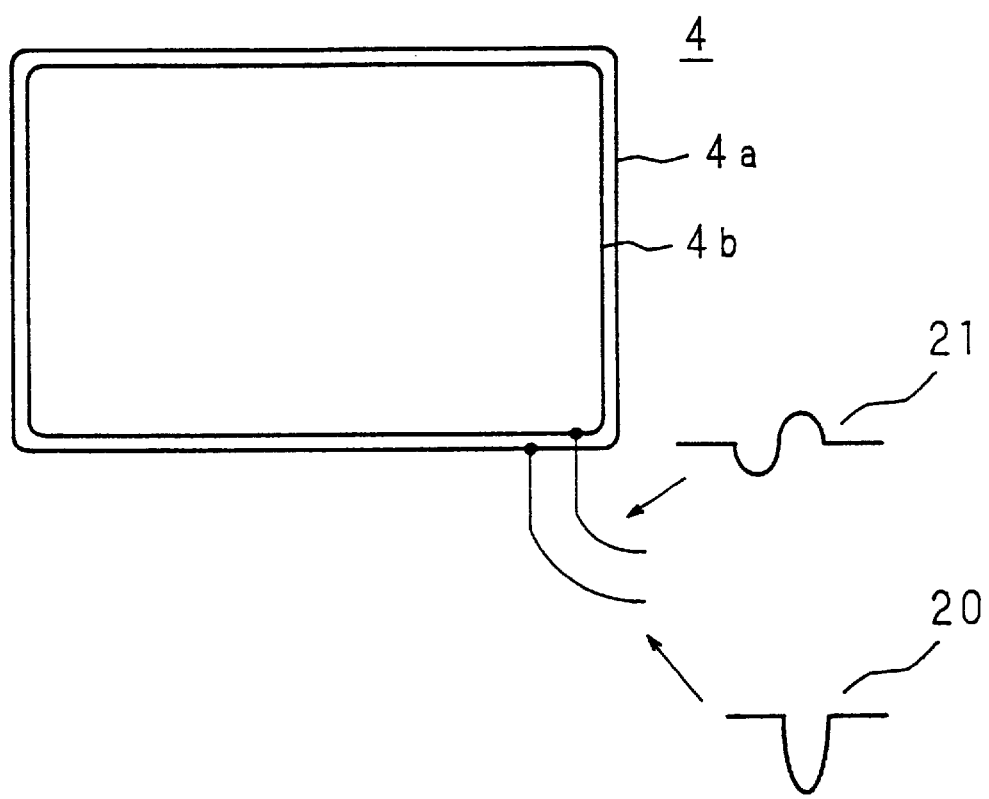
FIG. 4 is a diagram showing a cancellation electrode shown in FIG. 3.

FIG. 4 shows an example of the detailed structure of the cancellation electrode 4 shown in FIG. 3, wherein the first cancellation electrode 4a is disposed in the outer portion of the cancellation electrode 4 and the second cancellation electrode 4b is disposed in the inner portion of the same. Note that the positions of the first and second cancellation electrodes 4a and 4b may be reversed to the positions shown in FIG. 4. However, the first and second cancellation electrodes 4a and 4b are required to substantially surround the CRT 1.

FIGS. 5A to 5F show waveforms in the respective portions shown in FIG. 3. FIG. 5A shows a waveform 15 of the radiated field 14. FIG. 5B shows the waveform of the retrace line pulse 6. FIG. 5C shows the waveform of the output signal 8 from the fly-back transformer 7. FIG. 5D shows a field waveform 51 formed due to incomplete cancellation. FIG. 5E shows a waveform 25 of the first cancellation field 24. FIG. 5F shows a waveform 27 of the second cancellation field 26. As is applied to the cancellation electrode 4 shown in FIG. 4, individual first and second cancellation pulse voltages 20 and 21 are respectively applied to the independent first and second cancellation electrodes 4a and 4b so that the first and second cancellation fields 24 and 26 having individual waveforms 25 and 27 are radiated. A synthesized electric field of the first and second cancellation fields 24 and 26 enables complete cancellation of the electric field to be performed.

The operation will now be described. Mainly due to the horizontal-deflection retrace line pulse to be applied to the deflection yoke 2 during the operation of the CRT 1, the radiated field 14 having the waveform 15 is generated in the front portion of the tube surface 3 of the CRT 1. To cancel the radiated field 14, the first cancellation pulse voltage 20 is applied to the first cancellation electrode 4a of the cancellation electrode 4 to generate the first cancellation field 24. Moreover, the second cancellation pulse voltage 21 is applied to the second cancellation electrode 4b of the cancellation electrode 4 to generate the second cancellation field 26. The synthesized waveform of the waveform 15 of the radiated field 14, the waveform 25 of the first cancellation field 24 and the waveform 27 of the second cancellation field 26 is formed into flat, that is, the intensity of the electric field is made to be zero by adjusting waveforms 25 and 27. As a result, the radiated field 14 from the deflection yoke 2 toward the front portion of the tube surface 3 of the CRT 1 is canceled.

The first and second cancellation pulse voltages 20 and 21 are individually adjusted in the amplitude adjuster 18 and the differential waveform adjuster 19 by using the output signal 8 from the fly-back transformer 7. The amplitude adjuster 18 composed of the dividing capacitors 18a and 18b divides the output signal 8 so as to adjust the amplitude of the first cancellation pulse voltage 20. As compared with a method of adjusting the amplitude by using the resistor being impossible to obtain a satisfactory cancellation effect because the cancellation pulse voltage has an integrated waveform due to an influence of the static capacities of the first and second cancellation electrodes 4a and 4b to ground and the like, the foregoing method has a characteristic that the influence of the foregoing type can be prevented. The differential waveform adjuster 19, composed of the capacitors 19a and 19b and the resistor 19c, makes and adjusts the differential waveform.

By adjusting the first and second cancellation fields 24 and 26 radiated from the first and second cancellation electrodes 4a and 4b as described above, a further complete cancellation can be performed. Since the waveforms of the first and second cancellation electrodes 4a and 4b can individually be adjusted, the adjustment can be performed more accurately and quickly as compared with the conventional method when the adjustment is, while observing the waveforms of the electric fields, performed on the manufacturing line or the like. The electric field radiated from the first cancellation electrode 4a is adjusted to form the difference waveform (indicated by reference numeral 51 shown in FIG. 5), and then the electric field radiated from the second cancellation electrode 4b is gradually enlarged in accordance with the differential waveform. Thus, a further complete cancellation state can be realized, and the adjustment can be performed simply and reliably.

Second Embodiment

Figure 6:
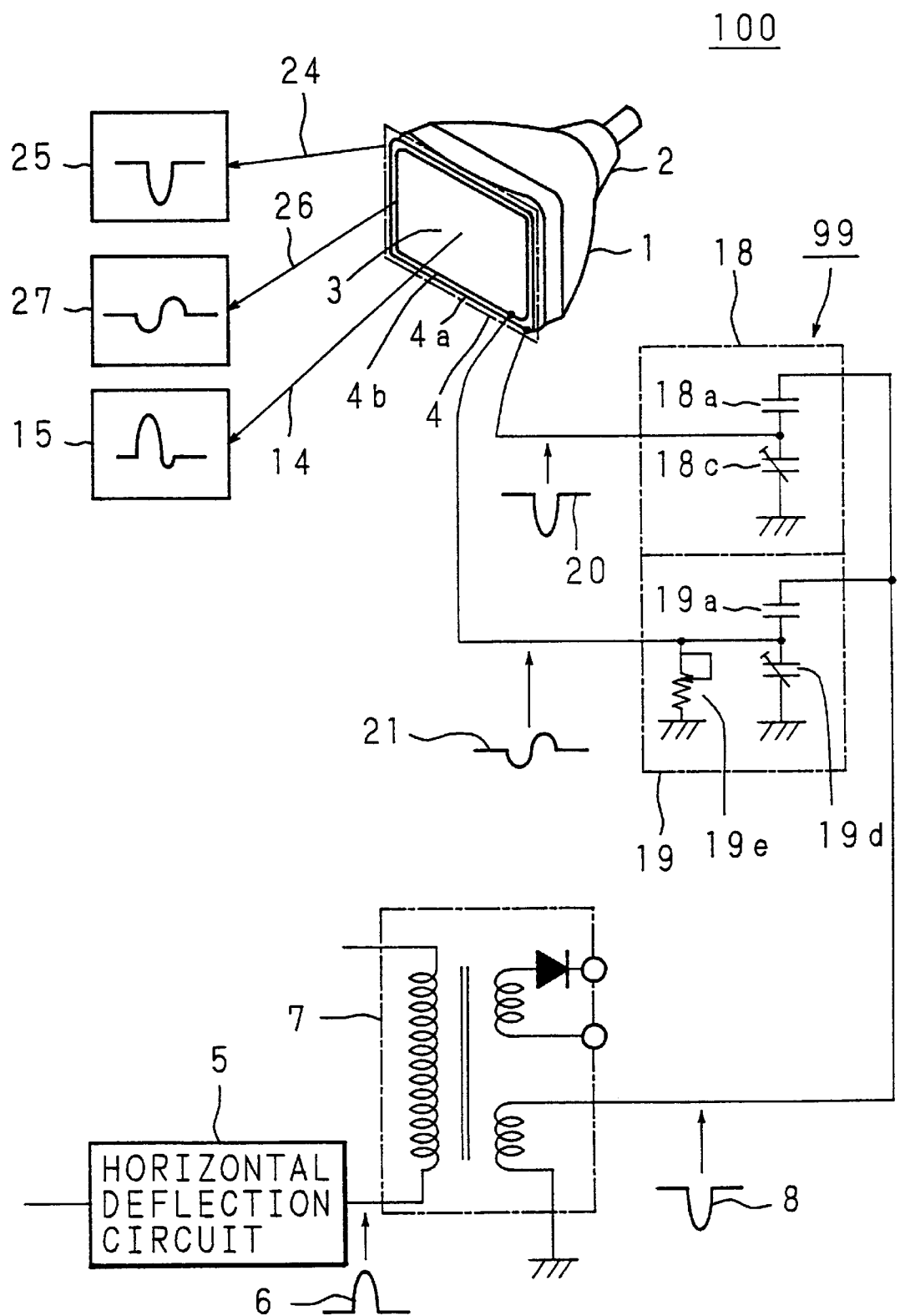
FIG. 6 is a structural view showing a display apparatus including a field radiation restriction circuit according to a second embodiment of the present invention.

A second embodiment of the present invention will now be described with reference to FIG. 6. The second embodiment has a structure such that the amplitude adjuster 18 is composed of a capacitor 18a and a trimmer capacitor 18c; and the differential waveform adjuster 19 is composed of a capacitor 19a, a trimmer capacitor 19d and a variable resistor 19e. One output winding wire for generating the output signal 8 from the fly-back transformer 7 is shared by the amplitude adjuster 18 and the differential waveform adjuster 19. Since the other structures are similar to those according to the first embodiment, the similar portions are omitted from description.

The operation will now be described. In the second embodiment, the field radiation restriction circuit 99 for canceling the radiated field 14 from the deflection yoke 2 toward the front portion of the tube surface 3 of the CRT 1 is arranged to continuously change the trimmer capacitor 18c to adjust the amplitude adjuster 18. Therefore, the first cancellation field 24 from the first cancellation electrode 4a can be adjusted continuously. Since the trimmer capacitor 19a and the variable resistor 19e are continuously changed to adjust the differential waveform adjuster 19, the second cancellation field 26 from the second cancellation electrode 4b can continuously be adjusted.

Third Embodiment

A third embodiment of the present invention will now be described with reference to FIG. 7. The field radiation restriction circuit 99 according to the third embodiment has the amplitude adjuster 18 composed of the capacitors 18a and 18b, the differential waveform adjuster 19 composed of the capacitors 19a and 19b and a FET 19f, and a control portion 30 composed of a CPU 30a and a DAC 30b. Similarly to the second embodiment, one winding wire for generating the output signal 8 from the fly-back transformer 7 is shared by the amplitude adjuster 18 and the differential waveform adjuster 19. Since the other structures are similar to those according to the first embodiment, the similar portions are omitted from description.

The operation will now be described. By changing the gate voltage of the FET 19f of the differential waveform adjuster 19, the second cancellation field 26 can continuously be adjusted. The voltage to be applied to a gate G of the FET 19f can be obtained by D/A conversion of optimum data stored in the CPU 30a of the control portion 30, the D/A conversion being performed by the DAC 30b. The optimum data is voltage to be applied to the FET 19f, capable of corresponding to the scanning frequency, which is being employed, and most satisfactorily canceling the radiated electric field.

Since the intensity of the radiated field 14 toward the front portion of the tube surface 3 of the CRT 1 is in a tendency of being enlarged in proportion to the horizontal deflection frequency of the horizontal deflection circuit 5, a value, with which the optimum field restriction can be performed, is detected with a variety of horizontal frequencies and the detected value is stored in the CPU 30a in order to cause the voltage value transmitted from the control portion 30 to change to correspond to the horizontal frequency. Thus, optimum field cancellation can be performed even if the scanning frequency is changed.

Although a trimmer DAC or the like capable of equivalently changing the resistance value with the voltage value or data in the CPU 30a may be employed in place of the FET 19f, the FET is employed in this embodiment because it can be used ordinarily. In place of the continuous adjustment by using the analog voltage value, a plural-step switching system may be employed in which the control portion 30 transmits combination of binary data items to cause the FET and an analog switch or the like to switch resistors or capacitors to perform selection with which the electric field can be canceled. Also in this case, an effect similar to that obtainable from the foregoing structure can be obtained.

Figure 7:
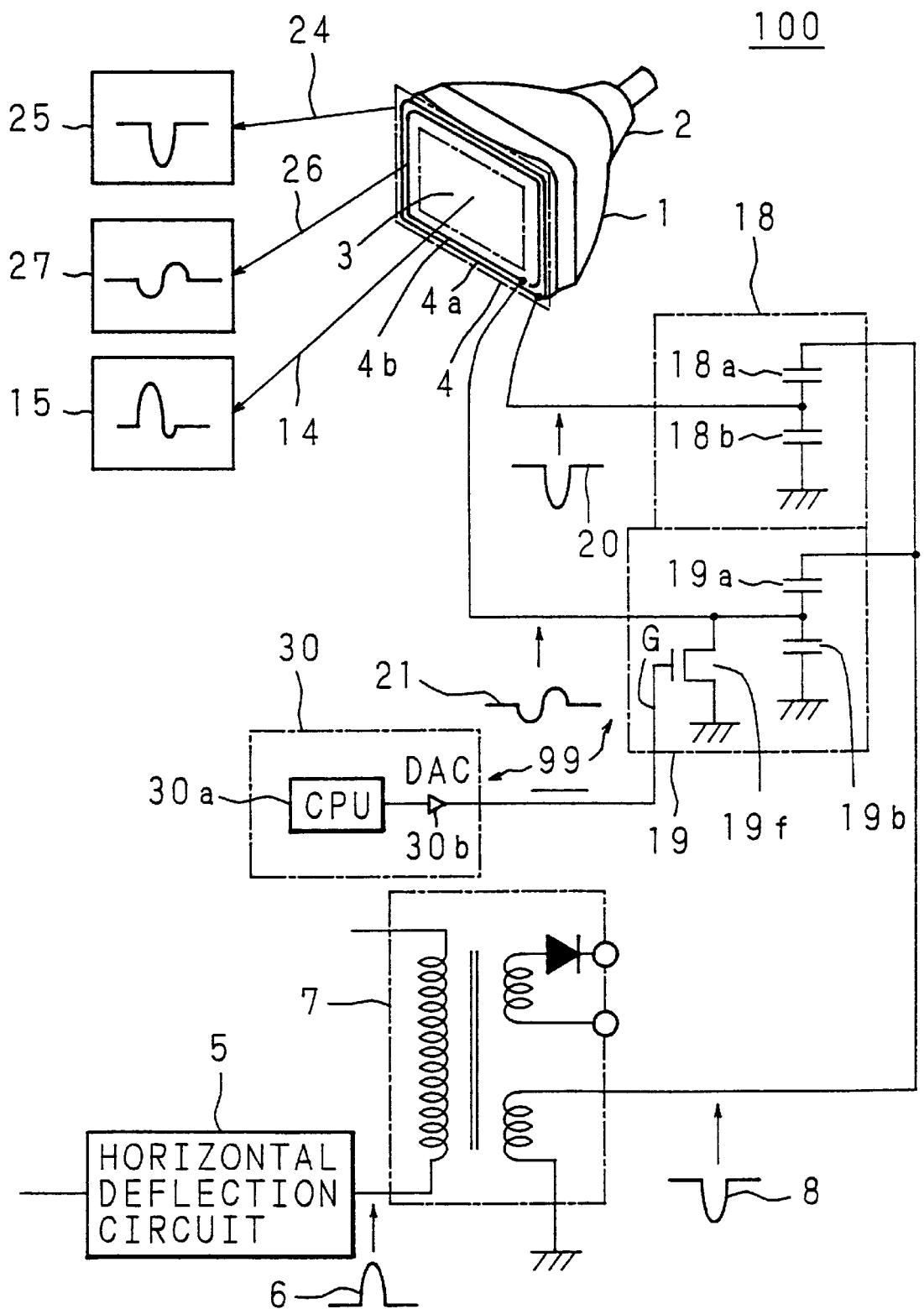
FIG. 7 is a structural view showing a display apparatus including a field radiation restriction circuit according to a third embodiment of the present invention.

Although the structure shown in FIG. 7 has the arrangement that the circuit to be controlled by the control portion 30 is only the differential waveform adjuster 19, the amplitude adjuster 18 may, of course, be controlled similarly by the control portion 30.

Fourth Embodiment

Figure 8:
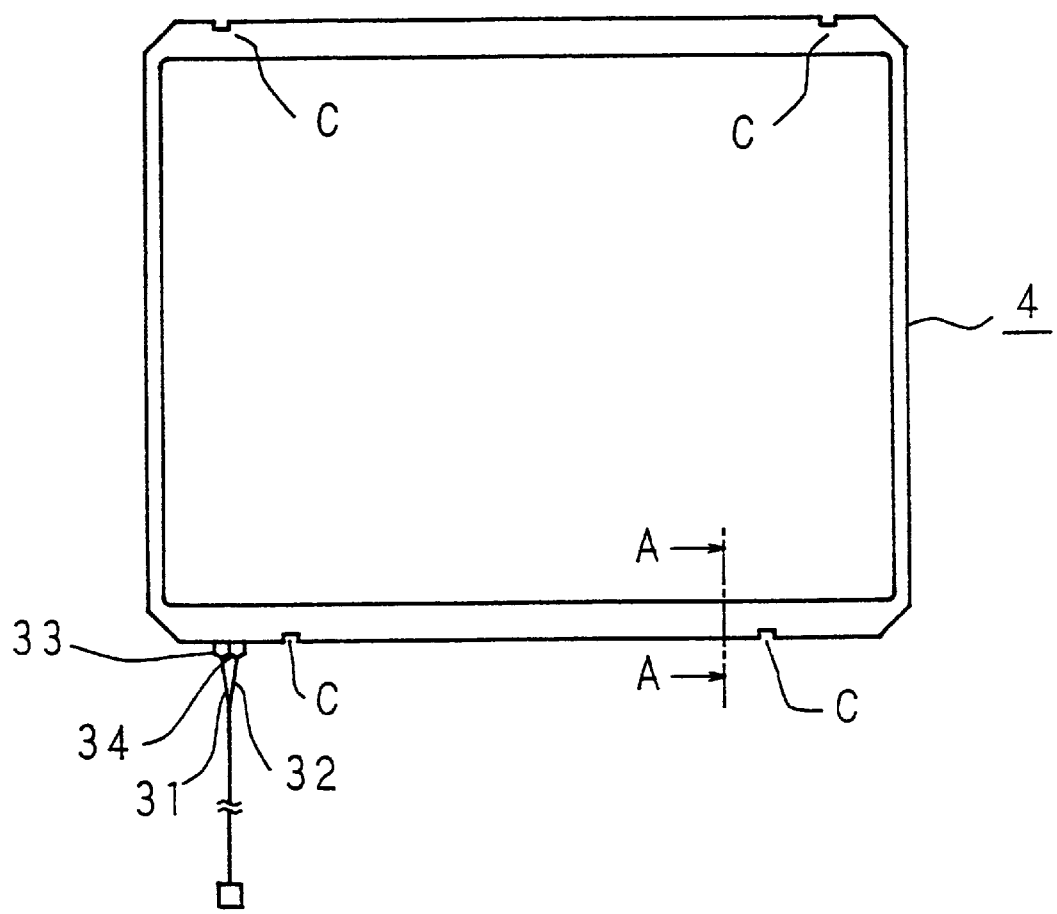
FIG. 8 is a diagram showing a field radiation restriction electrode (a cancellation electrode) according to a fourth embodiment of the present invention.
Figure 9:
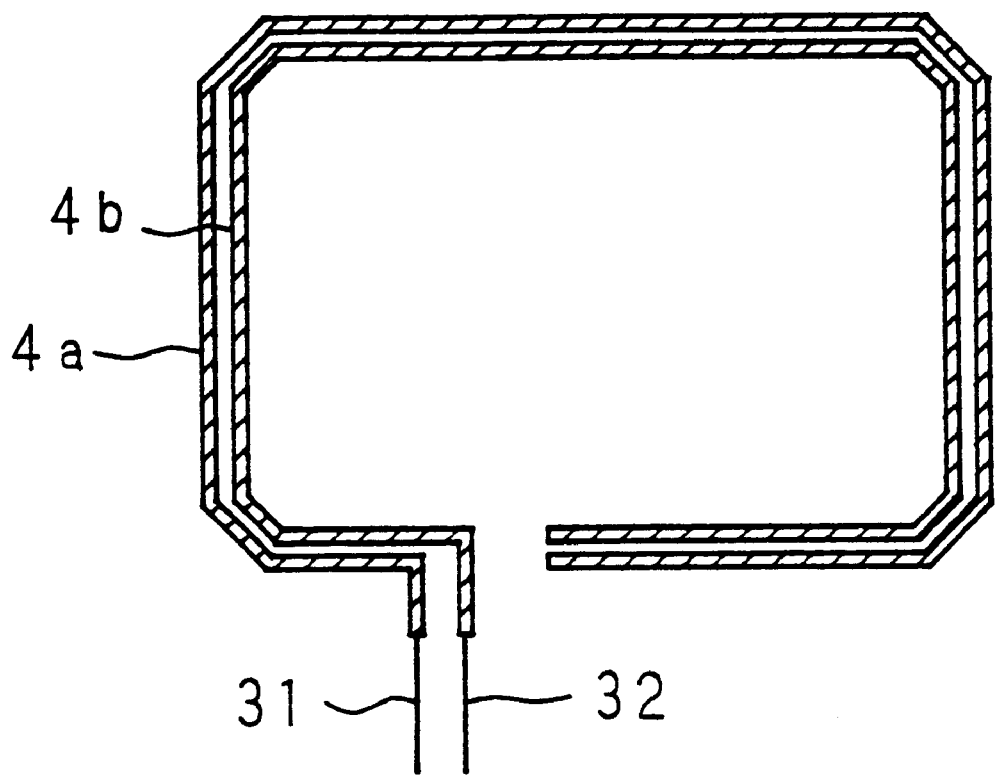
FIG. 9 is a diagram showing an electrode pattern of the field radiation restriction electrode (the cancellation electrode) shown in FIG. 8.
Figure 10:
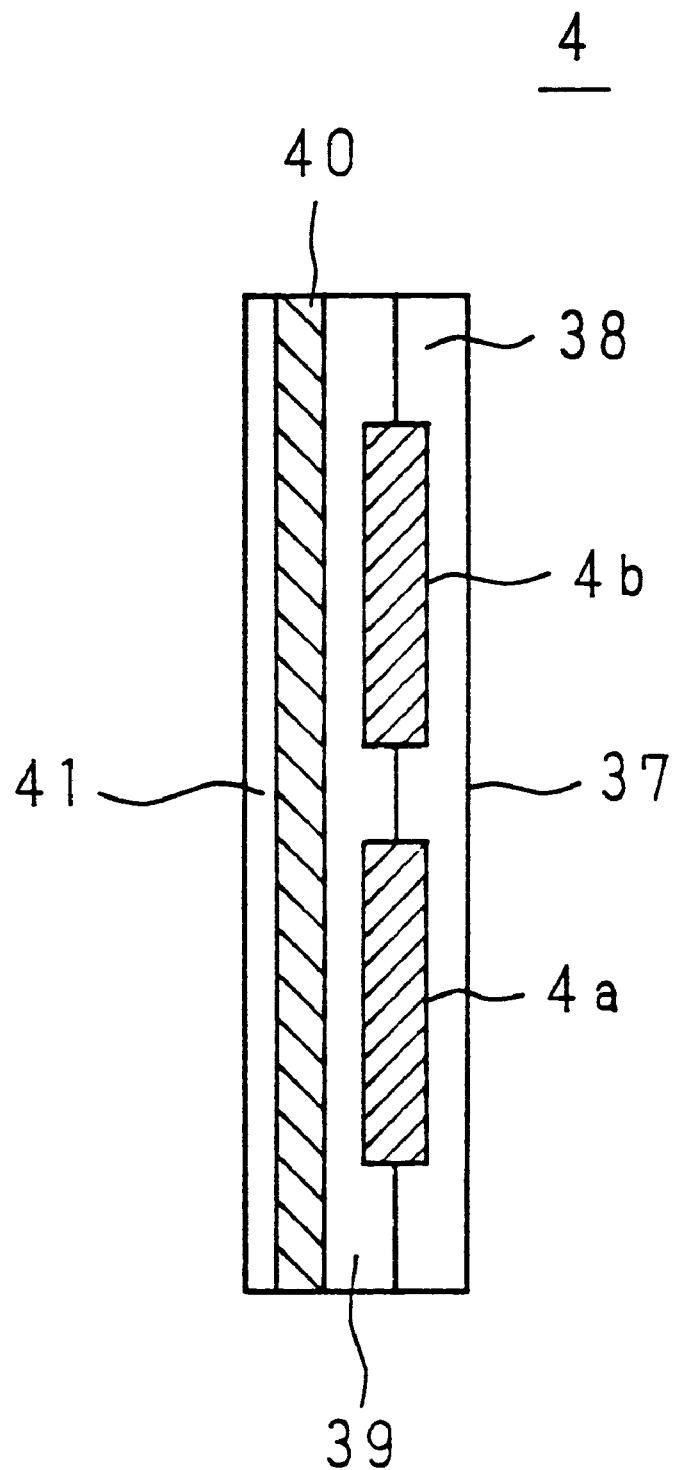
FIG. 10 is a cross sectional view showing the field radiation restriction electrode (the cancellation electrode) shown in FIG. 8.
Figure 11:
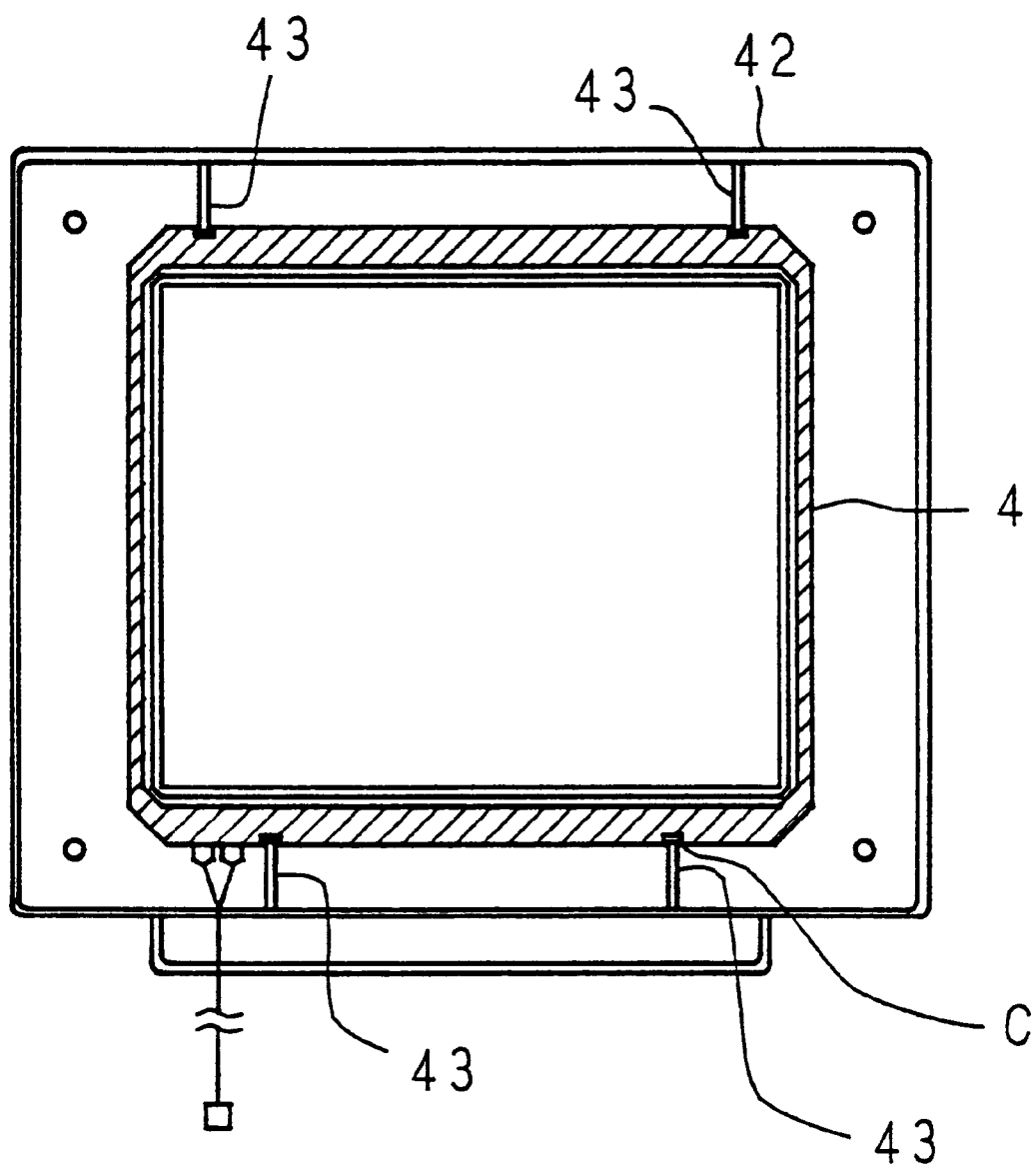
FIG. 11 is a diagram showing an example in which the field radiation restriction electrode (the cancellation electrode) shown in FIG. 8 is attached.

A fourth embodiment of the present invention will now be described with reference to FIGS. 8 to 10 showing the structure of the cancellation electrode 4 and FIG. 11 showing a state where the cancellation electrode 4 is attached. Referring to FIG. 8, reference numerals 31 and 32 represent lead wires respectively connected to the first and second cancellation electrodes 4a and 4b. The lead wires 31 and 32 respectively are caulked to form crimp contacts 33 and 34. The cancellation electrode 4 has cut portions C which are engaged to ribs 43 of a bezel 42 to be described later.

FIG. 9 shows the shapes of the first and second cancellation electrodes 4a and 4b of the cancellation electrode 4. Although an open ring shape is shown in FIG. 9, the shape may be a closed ring shape. As described above, the first and second cancellation electrodes 4a and 4b are required to be formed to substantially surround the tube surface 3 of the CRT 1.

FIG. 10 is a cross sectional view taken along line A—A of FIG. 8. To protect and insulate the first and second cancellation electrodes 4a and 4b, the first and second cancellation electrodes 4a and 4b are held between two protective sheets 38 and 39 made of PET films or the like in such a manner that the first and second cancellation electrodes 4a and 4b do not overlap. Thus, the first and second cancellation electrodes 4a and 4b are formed as a printed wiring pattern in a printed wiring board 37 composed of the two protective sheets 38 and 39 and the like. The printed wiring board 37 has, on either side thereof, a bonding adhesive layer 40 for attaching the cancellation electrode 4 and a separator 41 which is separated when the cancellation electrode 4 is attached, the bonding adhesive layer 40 and the separator 41 being laminated in this sequential order.

FIG. 11 is a diagram showing an example of a state where the cancellation electrode 4 has been attached. The bezel 42 is disposed to surround the front surface of the CRT 1, the bezel 42 having a plurality of reinforcing ribs 43. As shown in FIG. 11, the cancellation electrode 4 is bonded to the reverse side of the bezel 42.

The operation of this embodiment will now be described. The cancellation electrode 4 according to the fourth embodiment has the electrode portion formed into a conductive pattern to efficiently attach the plural electrodes so that the attaching operation is facilitated. Although this embodiment has the structure such that the cancellation electrode 4 has the two conductive patterns as the first and second cancellation electrodes 4a and 4b, change of the structure can easily be performed in an example case where the cancellation electrode is formed by one conductive pattern such that a groove is formed between the conductive patterns.

Since the size of the cancellation field radiated from the cancellation electrode is changed in accordance with the area of the cancellation electrode pattern projected forwards, the effect of canceling the electric field can be adjusted by changing the area of the pattern. However, the adjustment is usually performed by changing the voltage.

The cut portions C are effective to prevent contact with the ribs 43 when the cancellation electrode 4 has been bonded to the reverse side of the bezel 42, the cut portions C as well as being capable of preventing unintentionally shift of the position to which the cancellation electrode 4 is attached. Since the cancellation electrode 4 has the bonding adhesive layer 40 and the separator 41, separation of the separator 41 results in the cancellation electrode 4 being easily bonded to the reverse surface of the bezel 42 thanks to the bonding adhesive layer 40. Since the cancellation electrode 4 is a flexible electrode, adaptation to change in the position, to which the cancellation electrode 4 is attached, or change in the curved surface of the bezel 42 is permitted.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A display apparatus comprising:
    a CRT having a deflection yoke;
    a plurality of field radiation restriction electrodes disposed adjacent to the peripheral portion of a display surface of said CRT; and
    a field radiation restriction circuit for applying voltage to said field radiation restriction electrodes;
    wherein said field radiation restriction circuit includes an amplitude adjuster for applying, to at least one of said plural field radiation restriction electrodes, a first pulse voltage, the polarity of which is in reverse to the polarity of a pulse voltage to be applied to said deflection yoke, and
    a differential waveform adjuster for applying, to at least one other of said plural field radiation restriction electrodes which is different from said electrode to which the first pulse voltage has been applied, a second pulse voltage obtained by differentiating the pulse voltage to be applied to said deflection yoke.

2. A display apparatus according to claim 1, wherein said amplitude adjuster includes a capacitor dividing circuit having at least one trimmer capacitor.

3. A display apparatus according to claim 1, wherein said differential waveform adjuster includes a differential circuit having two capacitors and one variable resistor.

4. A display apparatus according to claim 1, wherein said field radiation restriction circuit includes at least one of the following: a variable capacity circuit and a variable resistor circuit.

5. A display apparatus according to claim 1, wherein said field radiation restriction circuit includes a control portion for transmitting field radiation restricting data corresponding to the horizontal scanning frequency of said CRT and at least one of the following: a variable resistor circuit and a variable capacity circuit, to be controlled in accordance with the data.

6. A display apparatus according to claim 1, wherein said field radiation restriction electrodes are plural printed wiring patterns formed on one printed wiring board disposed substantially perpendicular to the axis of said CRT in such a manner that the plural printed wiring patterns do not overlap.

7. A display apparatus according to claim 6, wherein said printed wiring board has, on either surface thereof, a bonding adhesive layer, and said bonding adhesive layer bonds and secures said field radiation restriction electrodes to the reverse surface of a bezel for securing said CRT to said display apparatus.

8. A field radiation restriction circuit for use in a display apparatus having a CRT and arranged to apply voltage to a plurality of field radiation restriction electrodes for radiating electric fields to cancel an electric field radiated from a deflection yoke of said CRT, comprising:
    an amplitude adjuster for applying, to at least one of said plural field radiation restriction electrodes, a first pulse voltage, the polarity of which is in reverse to the polarity of a pulse voltage to be applied to said deflection yoke, and
    a differential waveform adjuster for applying, to at least one other of said plural field radiation restriction electrodes, which is different from said electrode to which the first pulse voltage has been applied, a second pulse voltage obtained by differentiating the pulse voltage to be applied to said deflection yoke.

9. A field radiation restriction circuit according to claim 8, wherein said amplitude adjuster includes a capacitor dividing circuit having at least one trimmer capacitor.

10. A field radiation restriction circuit according to claim 8, wherein said differential waveform adjuster includes a differential circuit having two capacitors and one variable resistor.

* * * * *